UNITED STATES PATENT OFFICE.

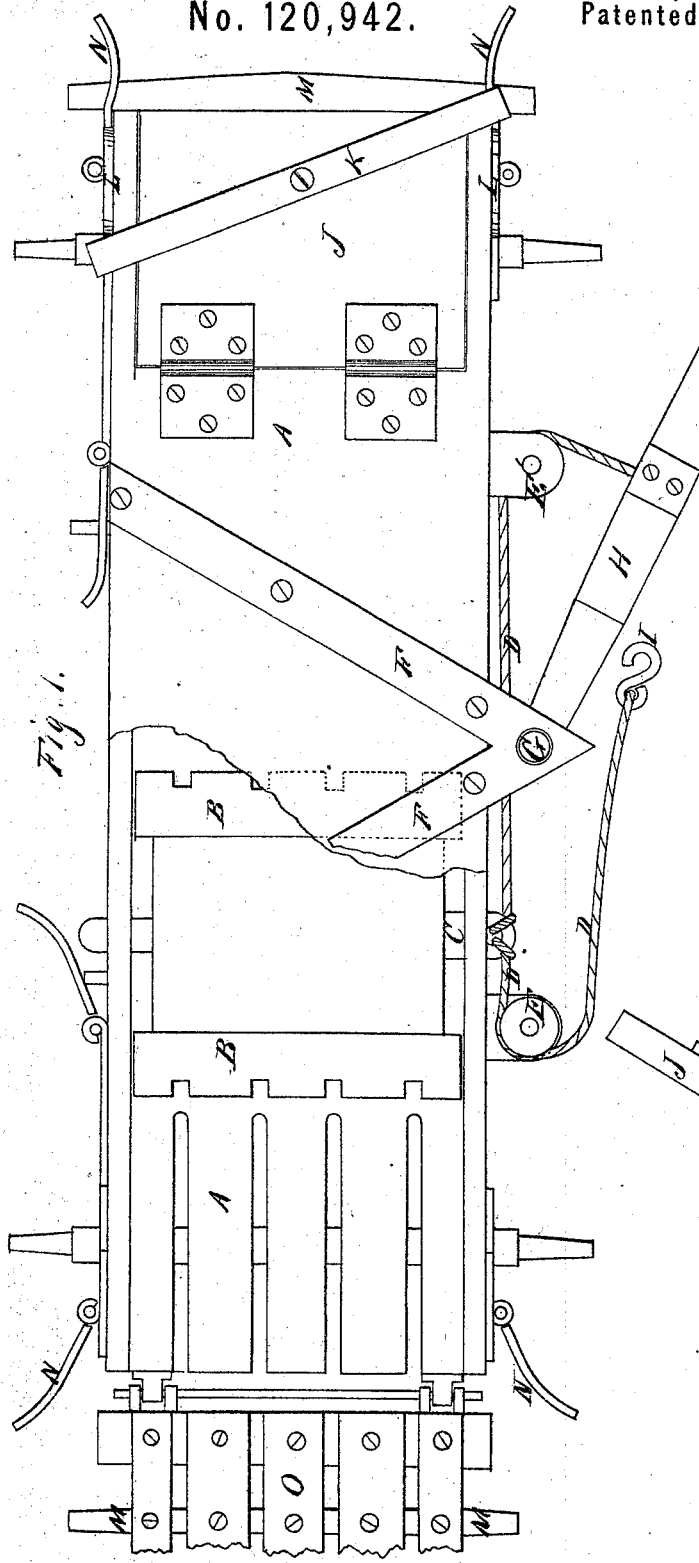
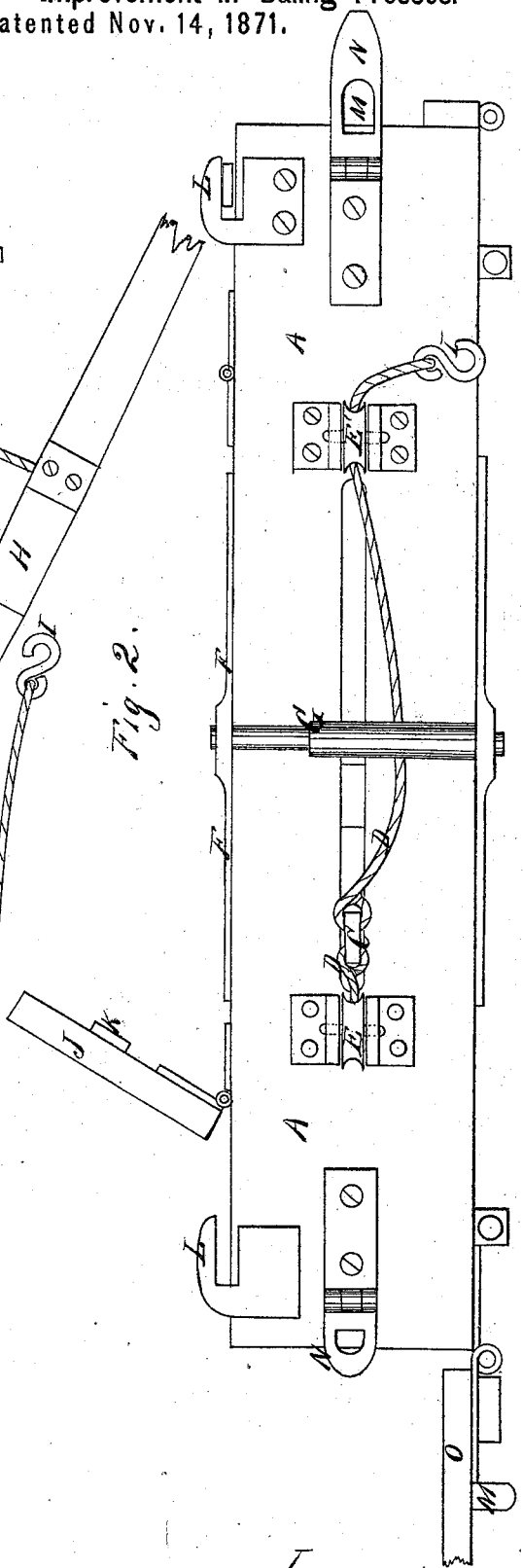

THOMAS J. CORNING, OF SAN JOSÉ, CALIFORNIA.

IMPROVEMENT IN BALING-PRESSES.

Specification forming part of Letters Patent No. 120,942, dated November 14, 1871.

*To all whom it may concern:*

Be it known that I, THOMAS J. CORNING, of San José, in the county of Santa Clara and State of California, have invented an Improvement in Baling-Presses; and I do hereby declare that the following is a full and exact description of the same, reference being had to the accompanying drawing and to the letters of reference marked thereon.

The object of my invention is to provide an improved baling-press; and it relates more especially to certain improvements on a horizontal press having double baling-compartments, for which Letters Patent were granted to me February 28, 1871, and numbered 112,224. My improvement consists mainly in the employment of a single elongated follower having an arm projecting through the side of the body of the machine. Stout ropes or chains pass from the end of this arm to and around pulleys situated at the ends of the travel of the follower, and from thence one or the other of the chains is carried to a horizontally-moving lever, to which the horse or other power is attached. This lever turns about a stout vertical shaft secured to the middle of one side of the press and describes a large arc of a circle, and from the position of the point of attachment of the chain it has all the effect of a cam-lever, acting with a gradually-increasing power till the bale is fully compressed.

Referring to the drawing, Figure 1 is a plan, with a part of the top removed to show the follower. Fig. 2 is a side elevation.

Similar letters indicate like parts.

A is an elongated chamber, the cross-section of which is of the same dimensions as two sides of the proposed bale, and the ends of the chamber form the baling-compartments. Within this chamber the follower B is made to move freely from end to end. This follower is solidly constructed, and is of sufficient length to move easily and without binding when the strain is on the operating arm. Friction-rollers may be placed in each of the corners, or in suitable places on the two sides, to still further relieve the follower. From a point midway in the length of the follower, and at any suitable position between the top and bottom, an arm, C, projects, so as to extend through the side of the chamber, as shown. This arm may also project through the top or bottom of the chamber, if desired. Strong chains or ropes D D' are secured to the outer end of the arm C and extend in opposite directions along the side of the chamber to the pulleys E E', around which they pass. These pulleys are situated far enough apart to allow the follower-arm the necessary motion between them. Strong braces F F are secured diagonally across the top and bottom of the chamber, and a stout shaft, G, stands vertically between their angles, in which it has its bearings. A long lever, H, is secured to move about this shaft, describing a semicircle in its movement from side to side. The horse or other power may be attached to the outer end of the lever, and can be driven around from one side to the other and then back, thus pressing the contents of one chamber and then the other alternately. In order to do this the follower is supposed to be drawn to one end, and the large compartment thus left is filled with the material to be pressed. After filling, the rope or chain E upon that side is carried out and attached, by means of a strong hook, I, and staple, to the lever. When the lever is started it exerts its least power and compresses the bale rapidly; but, as it arrives near the end of the arc, the cam-like motion has been reduced to a minimum, and, consequently, very great power is exerted. The cords for tying are laid in the spaces between the bottom and end timbers, and, when the bale is compressed, the cords are drawn up and tied in the usual manner. Meantime the other end of the chamber has been filled, and the horse merely turns around and travels to the other end of his semicircle. Both chains may be permanently attached to the lever, or one may be unhooked and the other hooked on at each trip. The filling-door of the press at each end is on top, as shown at J. This is strongly constructed, and has a bar, K, extending across it and pivoted at the center so as to turn and latch beneath the strong hooks L L on the sides of the frame. The end door O for discharging the bale is secured by a bar, M, and the hinged latches N at each end.

The whole may be mounted upon wheels of suitable height, so as to be easily transported from place to place.

By this construction I am enabled to dispense with all gearing and make a cheap, efficient, and substantial press.

Having thus described my invention, what I claim, and desire to secure by Letters Patent, is—

The single elongated follower B with its operating arm C, in combination with chains D, pulleys E, and the horizontally-moving lever H, operating substantially as described, for the purpose herein set forth.

In witness whereof I have hereunto set my hand and seal.

T. J. CORNING. [L. S.]

Witnesses:
C. W. M. SMITH,
PHILIP MAHLER. (7)